(12) United States Patent  (10) Patent No.: US 7,549,403 B2
Yamamoto et al.  (45) Date of Patent: Jun. 23, 2009

(54) ENGINE GENERATOR (75) Inventors: Masanobu Yamamoto, Shizuoka-ken (JP); Takahide Sugiyama, Shizuoka-ken (JP)

(73) Assignee: Yamaha Motor Power Products Kabushiki Kaisha, Shizuoka (JP)

( * ) Notice: Subject to any disclaimer, the term of this patent is extended or adjusted under 35 U.S.C. 154(b) by 400 days.

(21) Appl. No.: 11/326,865

(22) Filed: Jan. 6, 2006

(65) Prior Publication Data

US 2006/0214425 A1   Sep. 28, 2006

(30) Foreign Application Priority Data

Jan. 6, 2005   (JP) ............................. 2005-001429

(51) Int. Cl.
*F01P 1/02* (2006.01)
*H02K 7/18* (2006.01)

(52) U.S. Cl. ..................................... 123/41.7; 290/1 B
(58) Field of Classification Search .................... 123/2, 123/41.56, 41.66, 41.69, 41.7, 198 E; 290/1
See application file for complete search history.

(56) References Cited

U.S. PATENT DOCUMENTS

| | | | |
|---|---|---|---|
| 4,548,164 A | | 10/1985 | Ylonen et al. |
| 4,595,841 A | | 6/1986 | Yaguchi |
| 4,608,946 A | * | 9/1986 | Tanaka et al. .................. 123/2 |
| 4,702,201 A | | 10/1987 | Odo et al. |
| 4,721,070 A | | 1/1988 | Tanaka et al. |
| 4,907,546 A | * | 3/1990 | Ishii et al. ................ 123/41.56 |
| 4,958,599 A | | 9/1990 | Yokoyama et al. |
| 5,121,715 A | * | 6/1992 | Nogami et al. .............. 123/41.7 |
| 5,624,589 A | * | 4/1997 | Latvis et al. ................ 219/133 |
| 6,028,369 A | * | 2/2000 | Hirose et al. ................ 290/1 A |
| 6,091,160 A | | 7/2000 | Kouchi et al. |
| 6,095,099 A | * | 8/2000 | Morohoshi et al. ............. 123/2 |
| 6,331,740 B1 | | 12/2001 | Morohoshi et al. |
| 6,362,533 B1 | * | 3/2002 | Morohoshi et al. .......... 290/1 A |
| D478,043 S | | 8/2003 | Iwatate et al. |
| 6,661,107 B2 | | 12/2003 | Higuchi et al. |

(Continued)

FOREIGN PATENT DOCUMENTS

JP   58197417 A   * 11/1983

(Continued)

*Primary Examiner*—Michael Cuff
*Assistant Examiner*—Hung Q Nguyen
(74) *Attorney, Agent, or Firm*—Knobbe, Martens, Olson & Bear, LLP (57) ABSTRACT An engine generator can have an engine duct for releasing to the outside a cooling air which is used to cool an engine and a muffler, and a generator duct for releasing to the outside a cooling air which is used to cool a generator. The engine duct and the generator duct can be formed in one body as an exhaust duct. The muffler and the generator can be laterally aligned in parallel with each other, and the engine duct and the generator duct can be located in a manner such that the directions of release of the cooling winds from the engine duct and the generator duct are parallel to each other. The exhaust duct can be located with the generator duct secured to a crankcase. An opening of the engine duct, and an opening of the generator duct can be laterally aligned with each other, and the opening of the generator duct can be positioned above the generator.

20 Claims, 12 Drawing Sheets

U.S. PATENT DOCUMENTS

| | | |
|---|---|---|
| 6,758,169 B2 | 7/2004 | Suzuki et al. |
| 6,792,897 B2 | 9/2004 | Higuchi et al. |
| 6,845,739 B2 * | 1/2005 | Nakamizo et al. ........ 123/41.56 |
| 6,917,121 B2 | 7/2005 | Akimoto et al. |
| 7,023,101 B2 | 4/2006 | Wang |
| 7,089,889 B2 | 8/2006 | Johnson et al. |
| 7,146,962 B2 * | 12/2006 | Sugimoto et al. ........ 123/198 E |
| 7,252,063 B2 | 8/2007 | Mazuka et al. |
| 7,309,927 B2 | 12/2007 | Sugiyama et al. |
| 2003/0178853 A1 | 9/2003 | Du Plessis et al. |
| 2004/0021320 A1 | 2/2004 | Yamada et al. |
| 2004/0155466 A1 | 8/2004 | Sodemann et al. |
| 2006/0157988 A1 | 7/2006 | Mazuka et al. |
| 2006/0214425 A1 | 9/2006 | Yamamoto et al. |
| 2006/0290138 A1 | 12/2006 | Kuo et al. |

FOREIGN PATENT DOCUMENTS

| | | |
|---|---|---|
| JP | 59074327 A * | 4/1984 |
| JP | 60-145415 | 7/1985 |
| JP | 07-312846 | 11/1995 |
| JP | 08-223856 | 8/1996 |
| JP | 10-213035 | 8/1998 |
| JP | 2002-309959 | 10/2002 |

* cited by examiner

ENGINE GENERATOR

PRIORITY INFORMATION

This application is based on and claims priority under 35 U.S.C. § 119 to Japanese Patent Application No. 2005-001429, filed on Jan. 6, 2005, the entire contents of which is hereby expressly incorporated by reference.

BACKGROUND OF THE INVENTIONS

1. Field of the Inventions

The present inventions relate to generator sets, and more particularly, the cooling systems of generator sets.

2. Description of the Related Art

"Engine generators" or "generator sets" usually have an engine driving a generator to generate electrical power. Some of such generator sets include an air cooling arrangement which includes guide members configured to guide cooling air to cool the engine and the generator. For example, Japanese Patent Document JP-A-Hei 7-312846 includes such an arrangement.

The generator set disclosed in JP-A-Hei 7-312846 includes two fans, one for directing ambient air toward the engine and the other for directing ambient air toward the generator. The cooling air directed toward the engine flows from the engine to the muffler, thereby cooling both the engine and muffler. On the other hand, the cooling air directed toward the generator flows from the generator to the muffler, thereby cooling both the generator and muffler. After cooling the muffler, these flows of cooling air are discharged through cooling air exhaust slots near the muffler.

SUMMARY OF THE INVENTIONS

An aspect of at least one of the embodiments disclosed herein includes the realization that forming cooling air guides so as to smoothly guide cooling air around an engine, a generator, and a muffler of the engine can be difficult. For example, such known generator sets have housings made from multiple pieces, some of which have portions of the air guides, and which form the complete air guides when fully assembled. These portions are configured to merge the air flows from the engine and the generator before flowing to the muffler. This results in complex shapes of the respective members forming the cooling air guides, and increases the number of such members. Also, it is difficult to achieve accuracy of mounting positions of such members so as to maintain a smooth air flow.

Thus, in accordance with an embodiment, an engine generator can comprise an engine, a muffler, a generator, and an engine cooling air path for allowing passage of cooling air for cooling an engine and a muffler. The engine generator can also include a generator cooling air path for allowing passage of a cooling air for cooling a generator. An engine duct can be configured to guide to the outside of the engine generator, the cooling air from the engine cooling air path. Additionally, a generator duct can be provided for guiding to the outside of the engine generator, the cooling air from the generator cooling air path, wherein the engine duct and the generator duct are formed in one monolithic body as a cooling air exhaust duct.

In accordance with another embodiment, an engine generator can comprise an engine, a muffler, a generator, and a single monolithic air guide assembly defining an engine and muffler cooling air passage configured to guide a first ambient air amount into the engine generator, into thermal communication with the engine and muffler, and to discharge the first ambient air amount to the outside of the engine generator. The single cooling air guide member can also define a generator cooling air passage configured to guide a second ambient air amount into the engine generator, into thermal communication with the generator, and to discharge the second ambient air amount to the outside of the engine generator, wherein the single monolithic cooling air guide assembly is formed in one body.

BRIEF DESCRIPTION OF THE DRAWINGS

The above-mentioned and the other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENTS

An engine generator 10 in accordance with various embodiments of the present inventions is described below with reference to drawings. The embodiments of the cooling system of the generator 10 are described in the context of an engine generator because they have particular utility in this context. However, the cooling systems disclosed herein can be used in other contexts, such as, for example, any device that utilizes air cooling.

FIGS. 1 through 5 show an engine generator 10 according to an embodiment. The outer surface of the engine generator 10 can be formed in a rounded, generally box shape. The generator 10 can include a pair of front and rear frames 11, 12 spaced apart from each other in the forward and rearward directions, a front panel 13 and a rear panel 17 located within the front frame 11 and the rear frame 12, respectively. Additionally, a top panel 14, an intake cover 15, an exhaust cover 16 and a bottom panel 18 can be located between the front frame 11 and the rear frame 12.

The front frame 11 and the rear frame 12 can be aluminum die castings of the same shape and include frame bodies 11a, 12a, respectively, formed in a generally square shape with both top sides having a round shape. However, other configurations can also be used.

The both top sides of the frame body 11a can be formed with a pair of projections 11b, 11c extending upwardly, and the both top sides of the frame body 12a can be formed with a pair of projections 12b, 12c extending upwardly. Handles 19a, 19b, which can be made of steel pipes or other materials, can be attached between the opposing projections 11b, 12b and 11c, 12c, respectively. The engine generator 10 can be carried by gripping one or more of the handles 19a, 19b.

The front panel 13 can be attached within the front frame 11 and as such can serve as a front face of the engine generator 10. The front panel 13 can be formed of resin material in one piece, however, other configurations can also be used.

The front panel 13 can be formed in a generally square shape with rounded corners, as viewed from the front side. An upper portion of the front panel 13 can be formed with a recess 13a of a generally oval shape can have a large vertical width at its left portion (on the left-hand side of FIGS. 1 and 2) and a small vertical width at its right portion. However, other configurations can also be used.

A circular recess 21 can be formed in the left portion of the recess 13a. Outlets 13b, various switches 13c, and the like can be disposed in the other portion of the recess 21.

The recess 21 can be separated into an upper portion and a lower portion by a partition 22, which can be horizontally located and can include a plate-like wall member projecting toward the front side. A protective portion 23, such as for example but without limitation, an iron bar, can be provided in a manner to enclose the front face and the opposite faces of the partition 22. An upper area 21a serving as the upper portion of the recess 21 can have a smaller (shallower) depth than a lower area 21b forming the lower portion of the recess 21.

The upper area 21a of a smaller depth can have a cock operating portion 24 and a choke operating portion 25 generally laterally aligned with each other, however, other arrangements can also be used. The lower area 21b of a larger depth can have a recoil knob 26.

The cock operating portion 24, choke operating portion 25 and recoil knob 26 can be disposed in a manner so as not to project outwardly from the surface of the peripheral edge of the front panel 13. The partition 22 can be formed with the front panel 13 in one body, and the protective portion 23 can be fixed to the front panel 13 with the ends of the protective portion 23 inserted in the front panel 13.

The top panel 14 can be attached between the opposing top edges of the front frame 11 and the rear frame 12 and as such can serve as a top face of the engine generator 10. The top panel 14 can be formed in the shape of a curved surface and extends laterally with its central portion curved upwardly.

The generally central portion of the top panel 14 can include a fuel supply inserting portion 14a formed so as to be raised for allowing insertion of a fuel supply port 27a of a fuel tank 27 (see FIGS. 6 through 9). A tank cap 14b can be attached to the fuel supply port 27a through the fuel supply portion inserting portion 14a.

Figure 1:
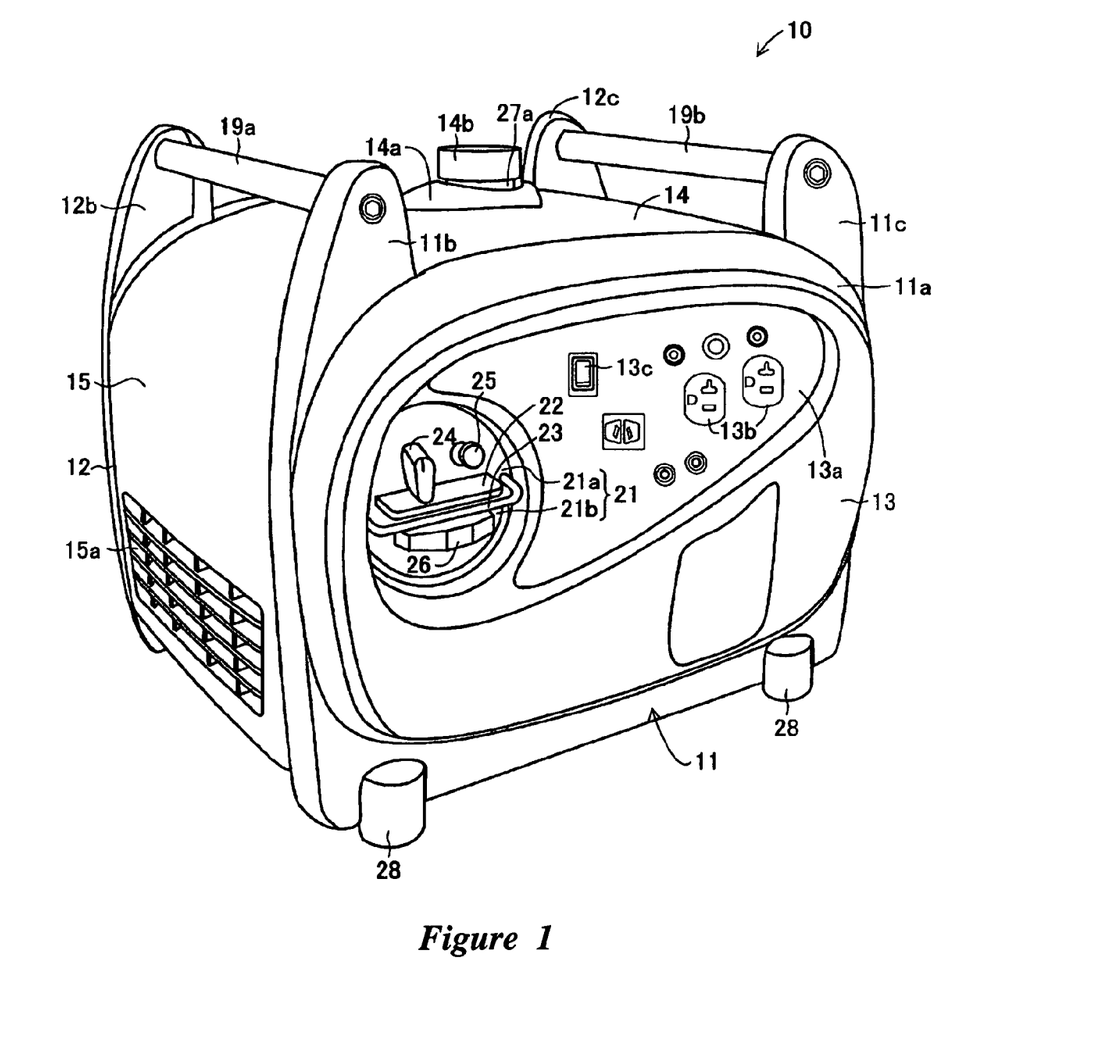
FIG. 1 is a perspective view of an engine generator in accordance with an embodiment.
Figure 2:
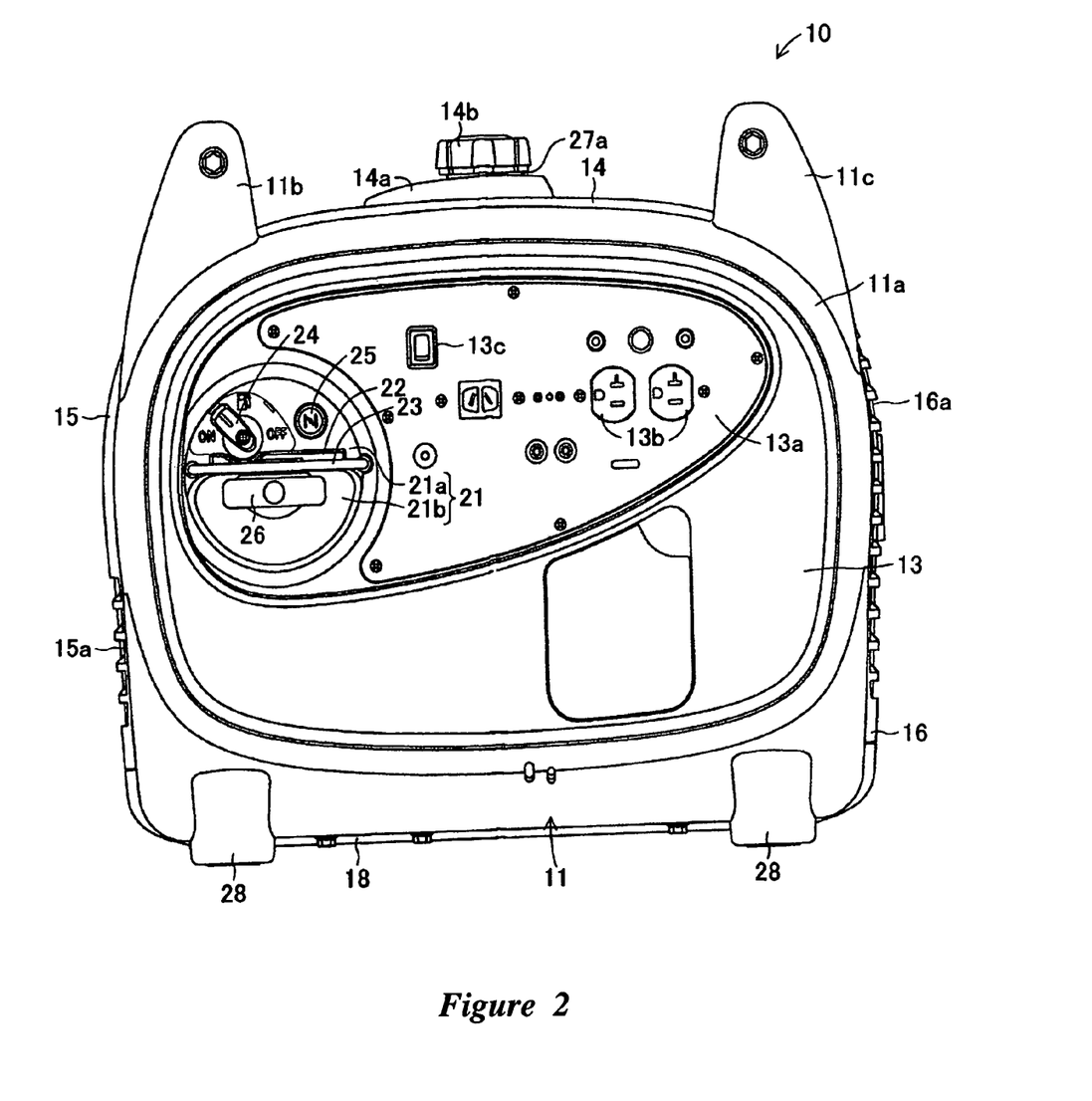
FIG. 2 is a front elevational view of the engine generator of FIG. 1.
Figure 3:
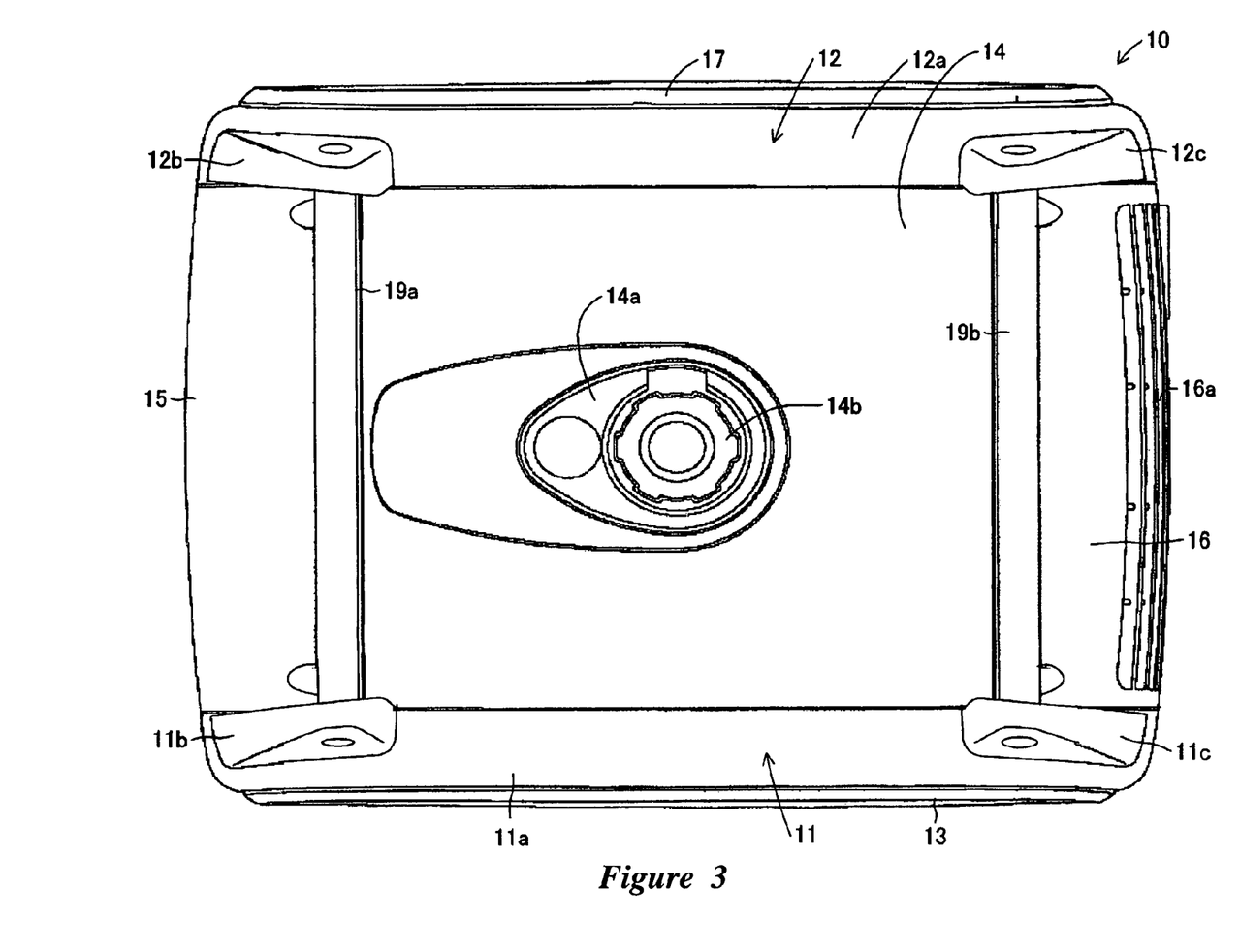
FIG. 3 is a top plan view of the engine generator.
Figure 4:
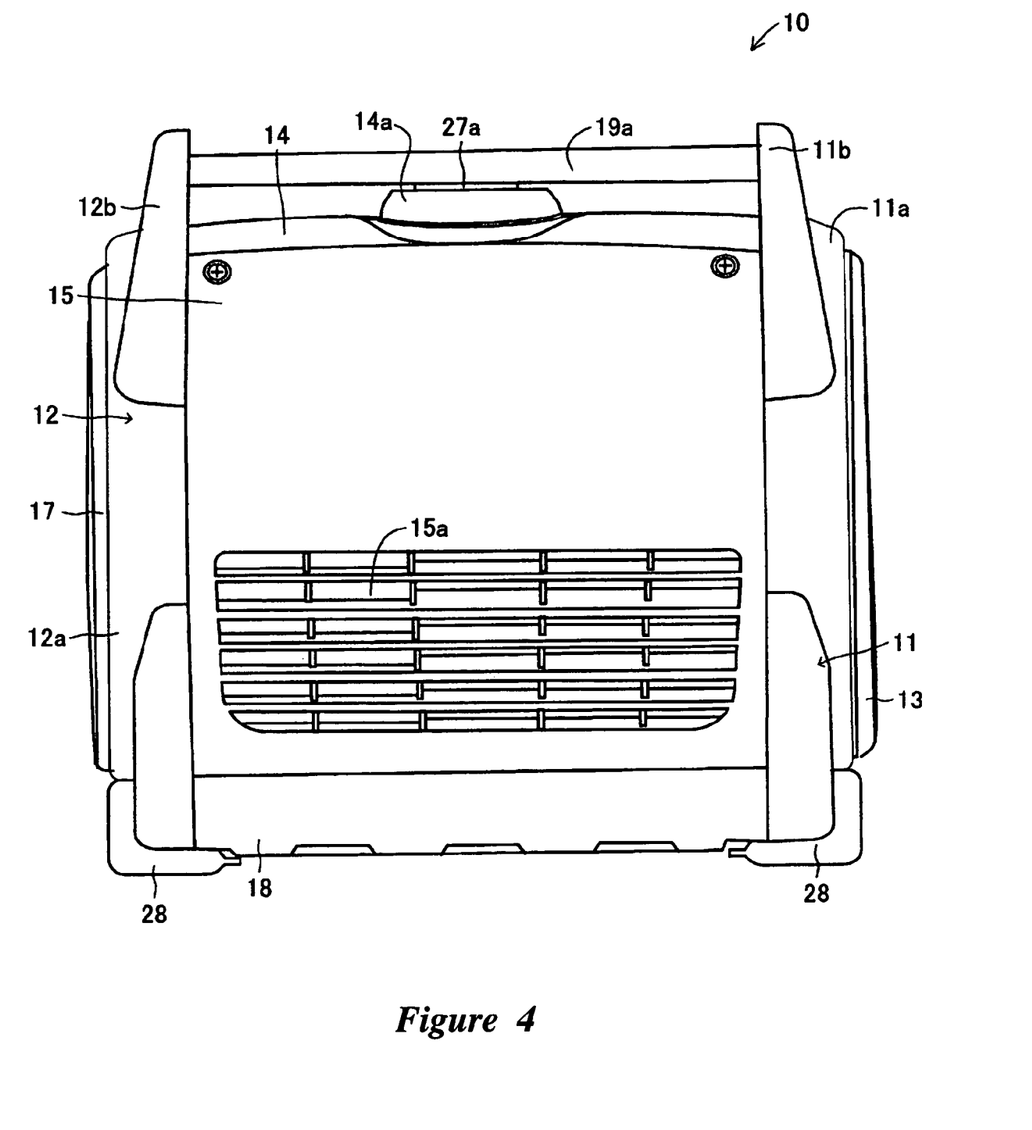
FIG. 4 is a left side elevational view of the engine generator.

The intake cover 15 and the exhaust cover 16 can be attached between the opposing side edges of the front frame 11 and the rear frame 12 and as such can serve as side faces of the engine generator 10. With reference to FIG. 4, a lower portion of the intake cover 15 can be formed with a plurality of intake openings 15a, which can be in the form of laterally extending slits generally vertically aligned with each other. However, the intake openings 15a can be formed in other shapes and configurations.

Figure 5:
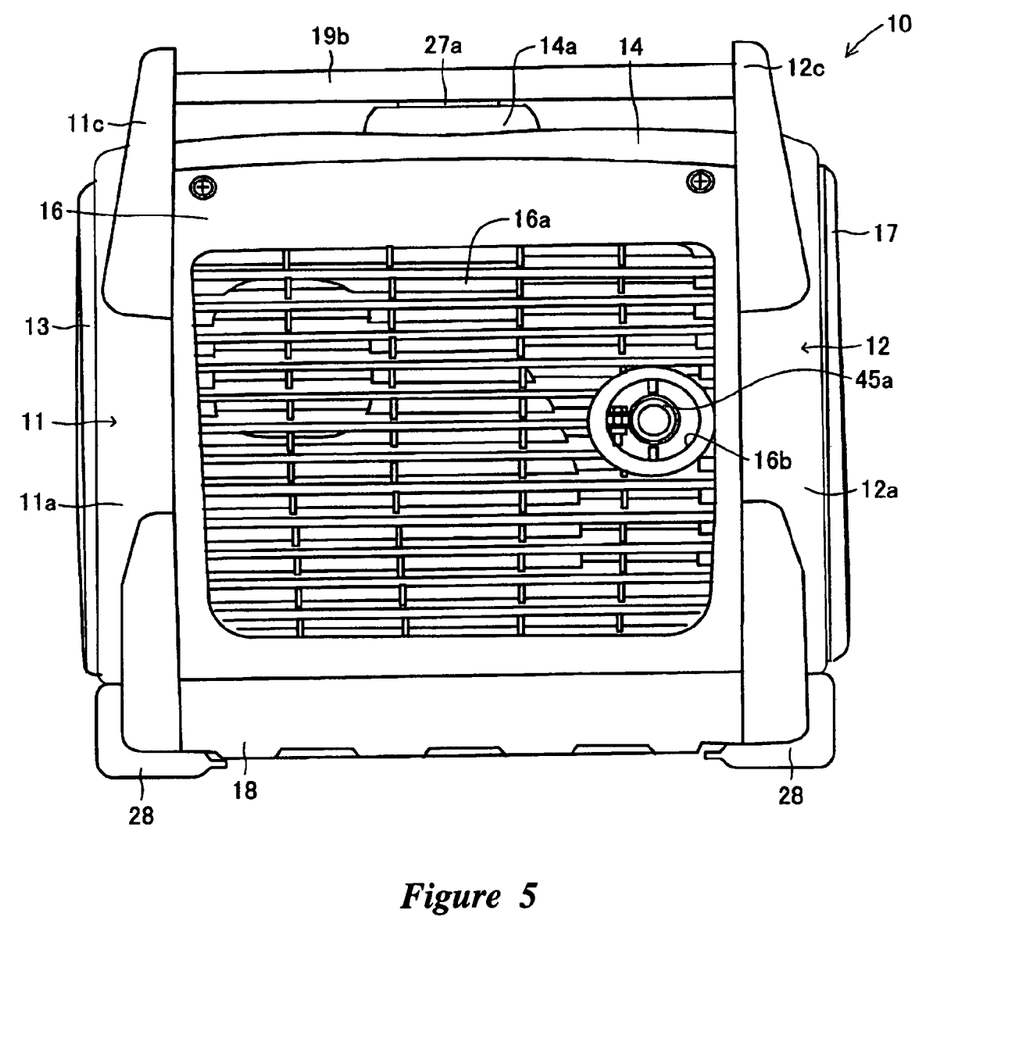
FIG. 5 is a right side elevational view of the engine generator.
Figure 6:
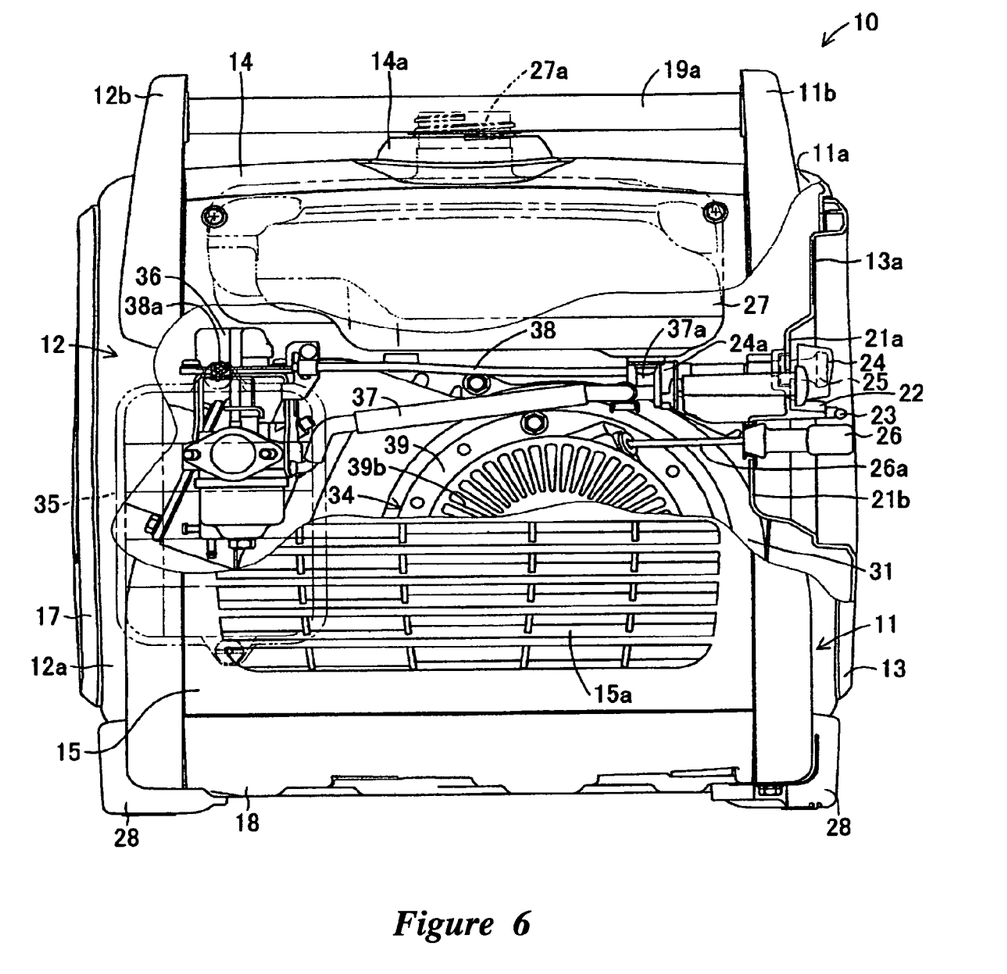
FIG. 6 is a partial cutaway and left side elevational view, showing some internal components of the engine generator.

With reference to FIG. 5, the exhaust cover 16 can also include a plurality of openings 16a, which can be in the form of a plurality of laterally extending exhaust slits generally vertically aligned with each other. However, the openings 16a can be formed in other shapes and configurations. A circular exhaust gas hole 16b can also be formed in a vertically generally central portion on the rear side of the exhaust cover 16.

The rear panel 17 can be attached within the rear frame 12 and thus can serve as a rear face of the engine generator 10. The overall shape of the rear panel 17 can be generally the same as that of the front panel 13. However, the rear panel 17 can be formed without recesses which are equivalent to the recesses 13a and 21 of the front panel 13.

The bottom panel 18 can be attached between the opposing bottom edges of the front frame 11 and the rear frame 12 and thus can serve as a bottom face of the engine generator 10. The left and right edges of the bottom panel 18 can be slightly raised from the opposite sides of the bottom face and can extend upwardly, and thus can serve as lower portions of the corresponding side faces of the engine generator 10.

The top panel 14, intake cover 15, exhaust cover 16, rear panel 17 and bottom panel 18 can each be integrally formed of resin material, and have sound insulating properties as with the front panel 13. Rubber legs 28 can be attached at the sides of the bottom edges of the front frame 11 and the rear frame 12.

Frames 29 made of metal sheets (see FIGS. 8 and 9) can be interposed between the front frame 11 and the rear frame 12 to securely connect these frames. The frames 29, front frame 11, rear frame 12, and handles 19a, 19b form a framework.

FIGS. 6 through 9 show the inside of the engine generator 10. A lower portion of the inside of the engine generator 10 can include an engine 31 and a generator 32 generally laterally aligned with each other, however, other orientations and configurations can also be used. The fuel tank 27 can be located above the engine 31 and the generator 32.

The foregoing fuel supply port 27a can be provided at a top central portion of the fuel tank 27. The fuel supply port 27a can extend through the fuel supply portion inserting portion 14a and projects upward from the top panel 14.

The removable tank cap 14b can be attached to the fuel supply port 27a. There can be located a controller 33 at the lower portion of the inside of the engine generator 10 and near the intake cover 15. An intake fan portion 34 for drawing ambient air can be mounted to the engine 31, on the controller 33 side.

An air cleaner 35 can be located at a vertically generally central portion on the rear left side (on the intake cover 15 side) of the inside of the engine generator 10. A carburetor 36 can be located adjacent to the air cleaner 35 and closer to a central portion of the engine generator 10 than the air cleaner 35. The air cleaner 35 can be positioned on the intake side of the engine 31, and can be configured to introduce and filter the ambient air drawn by the intake fan portion 34 and then feed it to the carburetor 36.

The carburetor 36 can be connected to one end of a fuel pipe 37 and one end of a choke cable 38. The other end of the fuel pipe 37 can be connected to a fuel cock 24a connected to the cock operating portion 24. The fuel cock 24a can be also connected to a fuel pipe 37a connected to the fuel tank 27.

Thus, when the user operates the cock operating portion 24 to open the fuel cock 24a, fuel in the fuel tank 27 can be supplied to the carburetor 36. On the other hand, when the fuel cock 24a is closed, fuel supply from the fuel tank 27 to the carburetor 36 is stopped.

The fuel supplied from the fuel tank 27 to the carburetor 36 can be mixed with the air supplied from the air cleaner 35 to the carburetor 36 into a mixture, which can be then supplied to the engine 31 through an intake passage (not shown). Meanwhile, the other end of the choke cable 38 can be connected to the choke operating portion 25. When the user operates the choke operating portion 25, a choke lever 38a between the one end of the choke cable 38 and the carburetor 36 can be rotated so that the richness of the mixture can be regulated.

Regulating the richness of the mixture can be accomplished by, for example, pulling the choke operating portion 25 so that the volume of air supplied from the air cleaner 35 to the carburetor 36 is reduced, and thus the richness of fuel can be increased. Pushing the choke operating portion 25 to return it to its original position increases the volume of air supplied from the air cleaner 35 to the carburetor 36, and thus the richness of fuel can be reduced.

The recoil knob 26 can be connected to a recoil starter 39 adjoining the engine 31, via a recoil rope 26a. The recoil starter 39 can be connected to a crankshaft 41 of the engine 31 (see FIG. 10), and pulling the recoil knob 26 causes the recoil starter to rotate the crankshaft 41 to start the engine 31.

Figure 10:
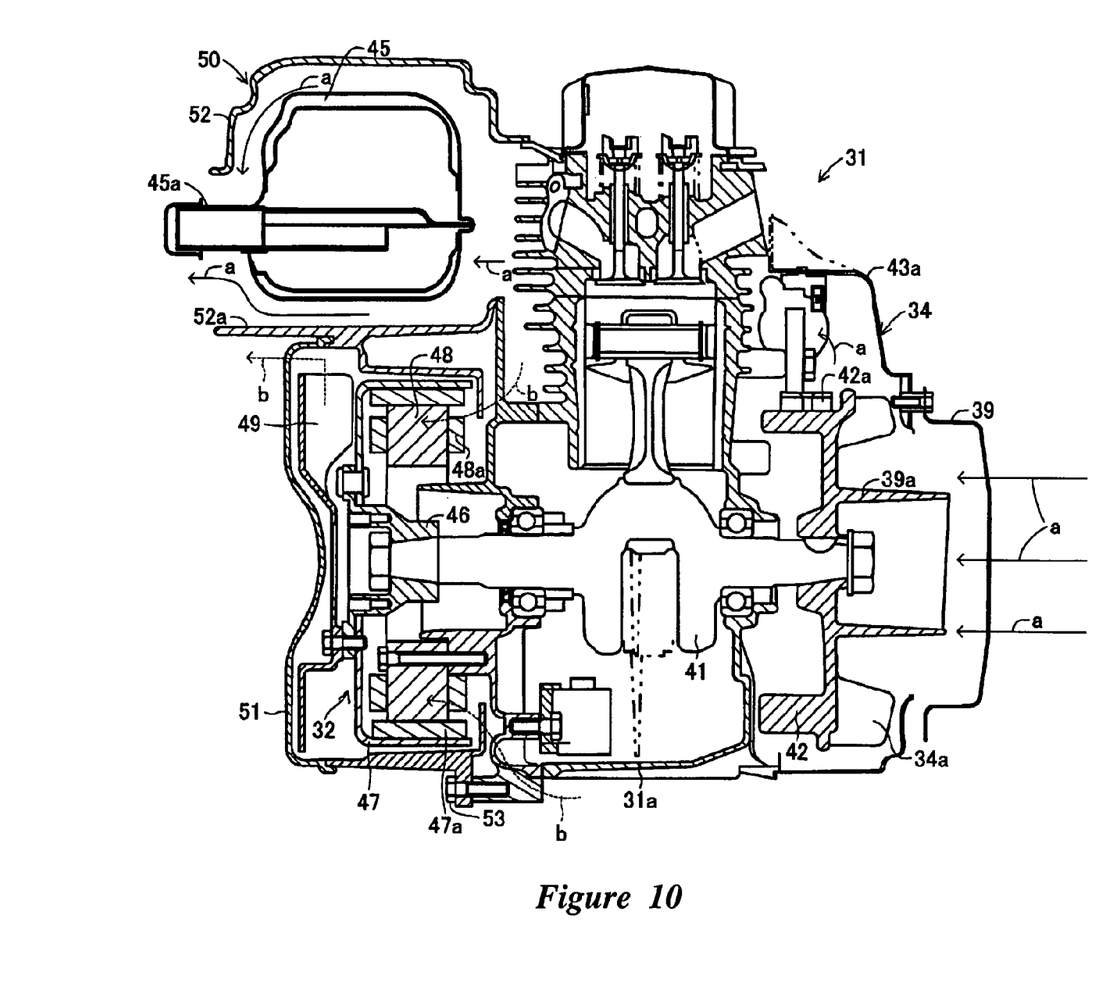
FIG. 10 is a sectional view of the engine generator, showing cooling air guides.

For example, as shown in FIG. 10, one end of the crankshaft 41 projects from a crankcase 31a of the engine 31 and extends toward the intake cover 15. A rotor 42 can be mounted to this end of the crankshaft 41. The outer peripheral face of the rotor 42 can be fitted with an ignition timing detecting magnet 42a. The face of the rotor 42 which can be closer to the end of the crankshaft 41, can also be formed with an intake fan 34a of the intake fan portion 34.

A cylindrical rotator 39a can be formed at a central portion of the face of the rotor 42 on which the intake fan 34a can be formed. The rotator 39a can be rotationally driven as the recoil starter 39 can be operated. The rotor 42 can be enclosed by a generally cylindrical fan cover 43a which covers the peripheral area of the crankshaft 41, and a lid-like recoil starter 39 which covers the end face of the crankshaft 41. The recoil starter 39 can be formed with plural wind introduction slots 39b. The recoil starter 39 and the fan cover 43a are formed of sheet-metal material.

The engine 31 can be provided with a spark plug 44, and a muffler 45 can be disposed on the exhaust side of the engine 31 (at a rear portion of the engine generator 10 on the exhaust cover 16 side). The spark plug 44 can be used to ignite the air/fuel mixture fed from the carburetor 36 to explode in the engine 31 so that the engine 31 can be operated. Exhaust gas discharged from the engine 31 can be delivered to the muffler 45 and released outside from an exhaust pipe 45a.

As shown in FIG. 10, the generator 32 can be connected through a rotor shaft 46 to the other end of the crankshaft 41, which projects from the crankcase 31a of the engine 31 and extends toward the exhaust cover 16. The generator 32 generates power as the rotor shaft 46 rotates.

For example, the end of the rotor shaft 46 can be fitted with a generally cylindrical rotor 47 having an opening on the engine 31 side. The inner peripheral face of the rotor 47 can be fitted with a plurality of magnets 47a. A stator 48 having a core wound with a coil 48a can be located on the inner peripheral side of the magnets 47a. When the magnets 47a rotate outside the coil 48a in connection with the crankshaft 41, an electromotive force can be produced in the coil 48a, so that power can be generated.

Figure 11:
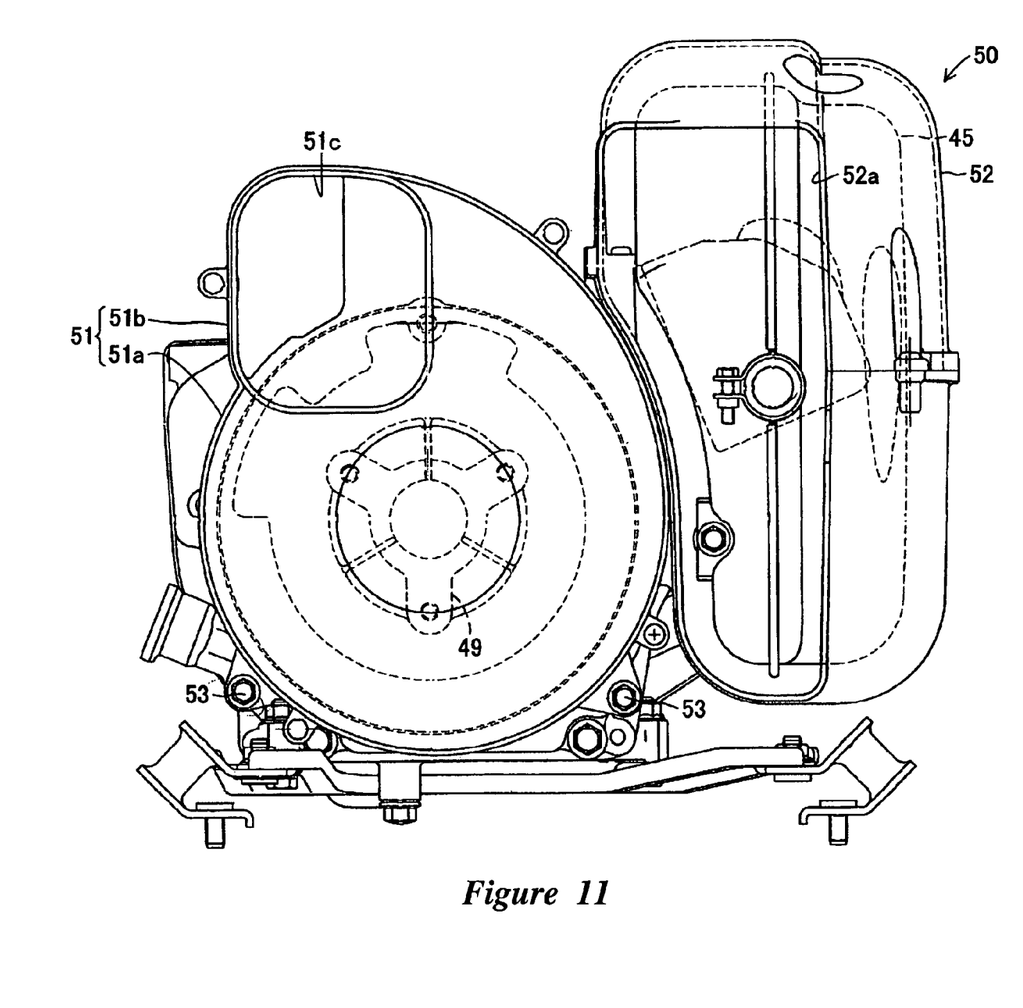
FIG. 11 is a front elevational view of the engine generator, with the outer housing removed, showing a cooling air exhaust duct.

An exhaust fan 49 can be attached to the rotor shaft 46 so that the air inside the engine generator 32 can be released outside as the crankshaft 41 rotates. The generator 32 and the muffler 45 can be covered with an exhaust duct 50. The exhaust duct 50 can be formed of resin material, and can include a generator duct 51 located on the generator 32 side and an engine duct 52 located on the muffler 45 side, as shown in FIG. 11.

The generator duct 51 can be made up of a circular, spiral, or other shaped duct body 51a formed to correspond to the shape of the generator 32 and the exhaust fan 49. Additionally, an exhaust portion 51b of a generally square cylindrical shape can project from an upper portion of the duct body 51a toward the exhaust cover 16. The end of the exhaust portion 51b can be formed with an exhaust opening 51c.

Ambient air drawn through intake holes (see FIG. 10) in a bottom portion and a front portion of the engine generator 10 and used to cool the engine generator 32, can be discharged from the opening 51c of the generator duct 51, as the exhaust fan 49 is driven.

Meanwhile, the engine duct 52 can be formed in a generally box shape to accommodate the muffler 45. A vertically elongated opening 52a can be formed in the face of the engine duct 52 on the exhaust cover 16 side in lateral alignment with the opening 51c of the generator duct 51. Ambient air drawn through the intake slits 15a of the intake cover 15 and used to cool the engine 31 and the muffler 45 can be discharged from the opening 52a, as the intake fan 34a is driven.

Figure 12:
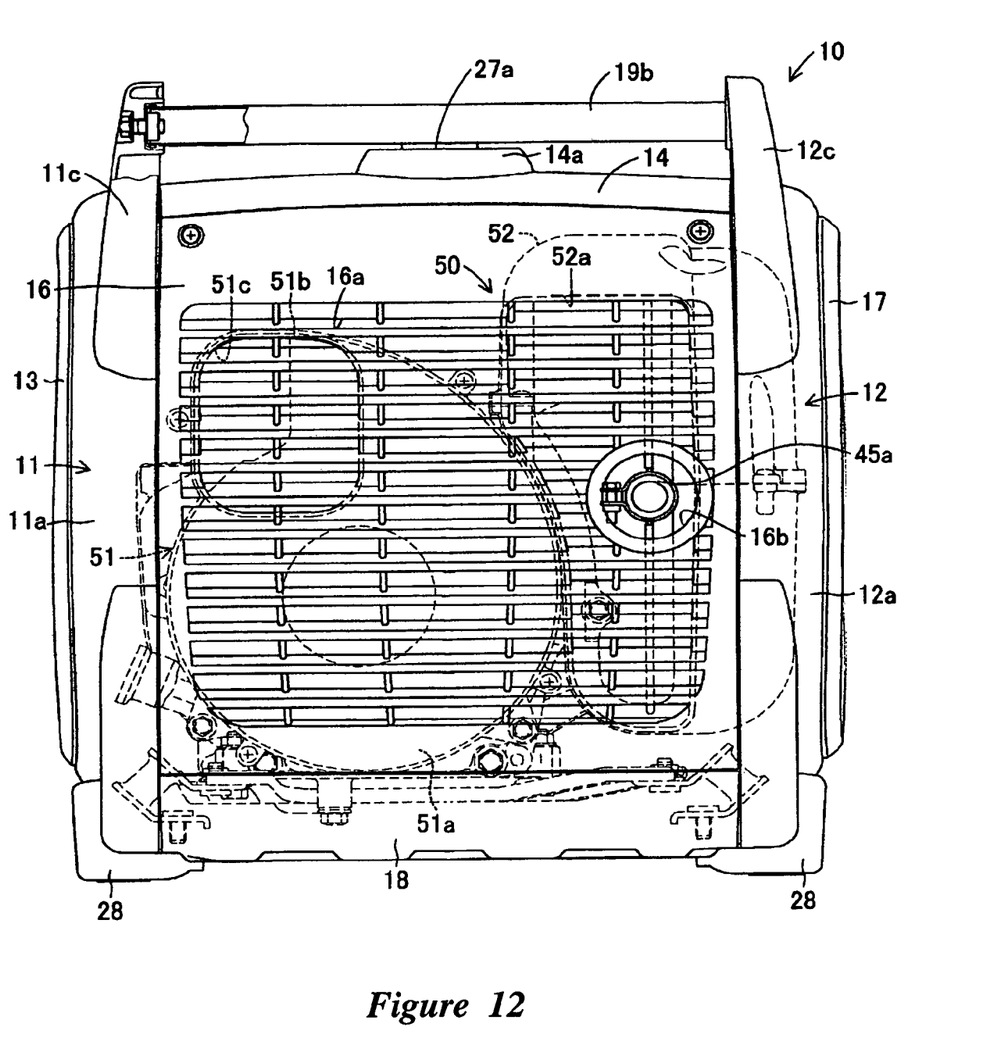
FIG. 12 is a right side elevational view of the engine generator with the outer housing in place and showing a cooling air exhaust cover and the cooling air exhaust duct.

The exhaust duct 50 can be mounted with the peripheral edge of the generator duct 51 secured to the crankcase 31a of the engine 31 with bolts 53. In such mounting state of the exhaust duct 50, as shown in FIG. 12, the opening 51c of the generator duct 51 can be positioned on the upper front side (on the left side of FIG. 12) of the exhaust cover 16 having the exhaust slits 16a, and the opening 52a of the engine duct 52 can be positioned on the rear side (on the right side of FIG. 12) of the exhaust cover 16.

In this configuration, to start the engine generator 10, the user first operates the cock operating portion 24 to open (turn on) the cock so that the fuel in the fuel tank 27 can be supplied to the carburetor 36. Then, the user pulls the choke operating portion 25 adjoining the cock operating portion 24 to reduce the volume of air supplied from the air cleaner 35 to the carburetor 36 so that the richness of the fuel fed to the engine 31 can be increased. This makes it easier to start the engine 31.

In such state, the user pulls the recoil knob 26 to start the engine 31. Then, when the engine 31 has been warmed up, the user returns the choke operating portion 25 to its original position so that the richness of the fuel supplied to the engine 31 can be optimized for regular operation of the engine 31. Then, power generated by the engine generator 10 can be used in other equipment by plugging an electrical cable into the outlet 13b.

Figure 7:
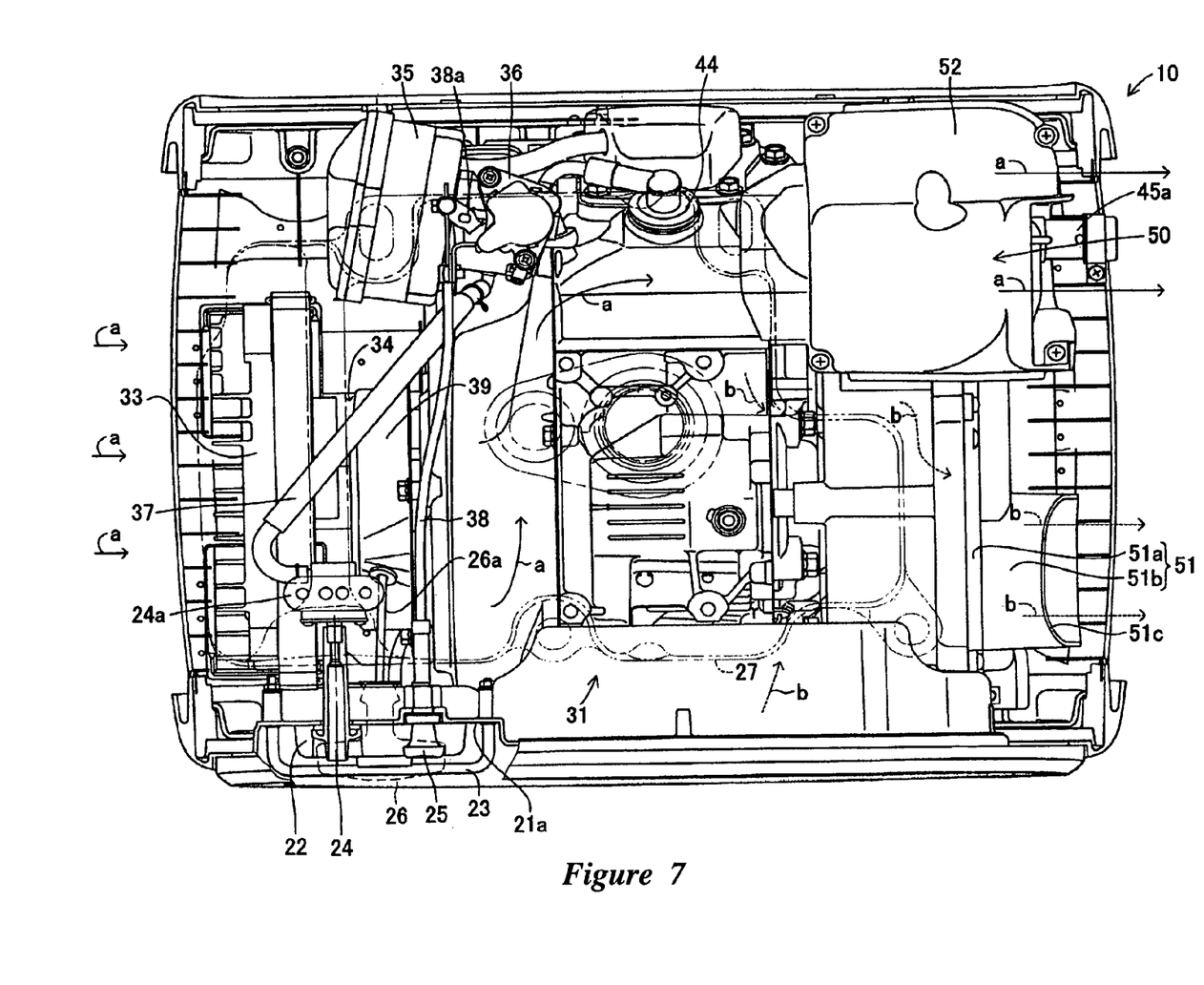
FIG. 7 is a partial cutaway and top plan view of the engine generator, showing some of the internal components of the engine generator and exemplary flows of cooling air.
Figure 9:
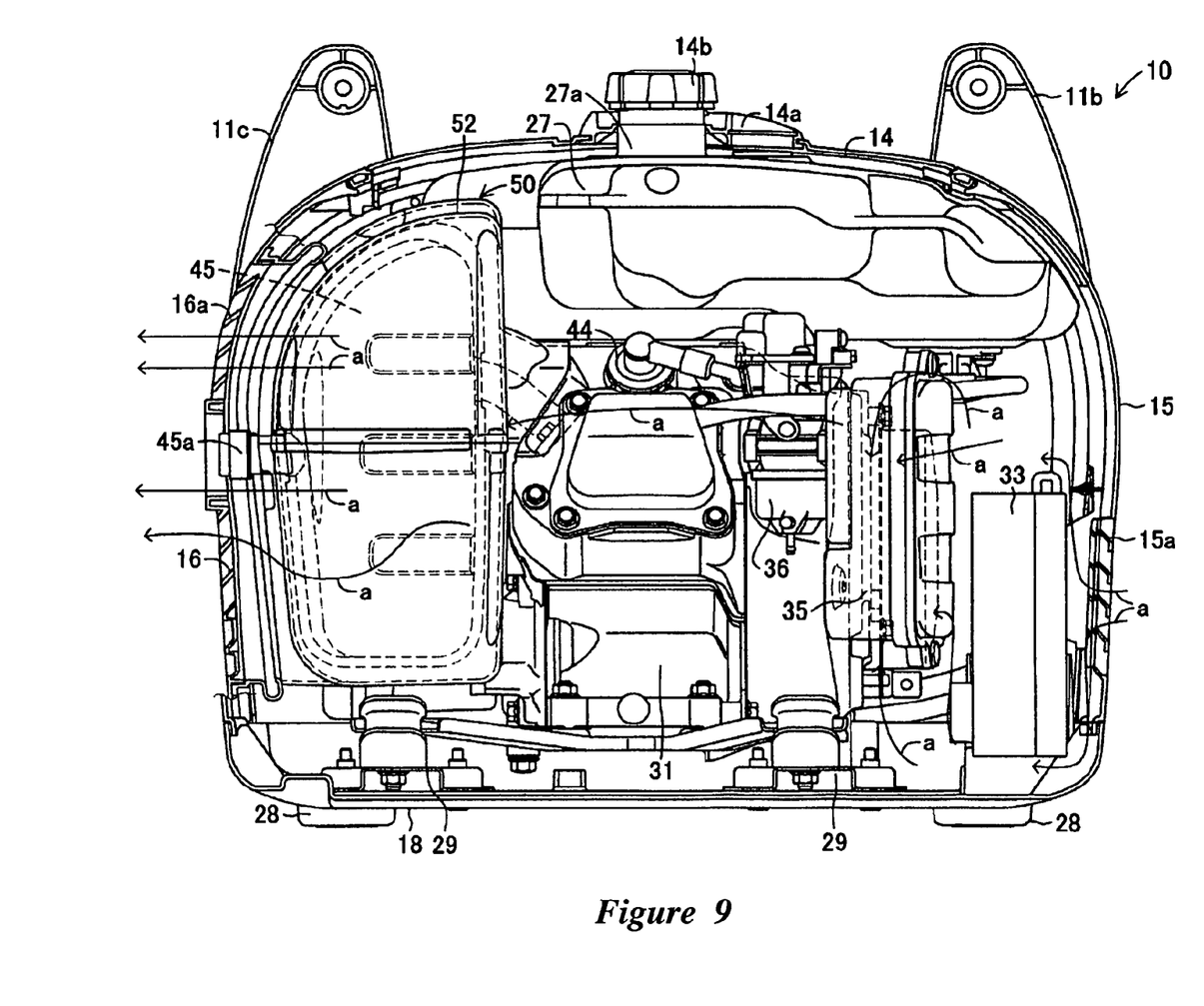
FIG. 9 is a partial cutaway and rear elevational view of the engine generator, showing exemplary cooling air paths in a duct inside the engine generator.

While the engine generator 10 is being operated, ambient air can be drawn in the engine generator 10 through the intake slits 15a of the intake cover 15, as shown in FIGS. 7 and 9 by the arrows a of solid lines, as the intake fan 34a is driven. The drawn ambient air flows above or under the controller 33 and then deep into the engine generator 10. Part of such air can be drawn in the air cleaner 35, flow through the carburetor 36 and the engine 31, and then can be released outside from the exhaust pipe 45a of the muffler 45, as exhaust gas.

The other part of the drawn ambient air can be used as cooling air. For example, such air can be drawn in the fan cover 43a through the air introduction slots 39b of the recoil starter 39, pass by the engine 31 to cool it, and then into the engine duct 52 of the exhaust duct 50. The air cools the muffler 45 while flowing through the engine duct 52, and then flows outside from the opening 52a. The cooling air, shown by the arrows a, which flows through an engine cooling air path, cools the engine 31 and the muffler 45 to maintain good operating conditions. Overheating of the controller 33 can be also prevented, so that it is operated in a desired temperature range.

Figure 8:
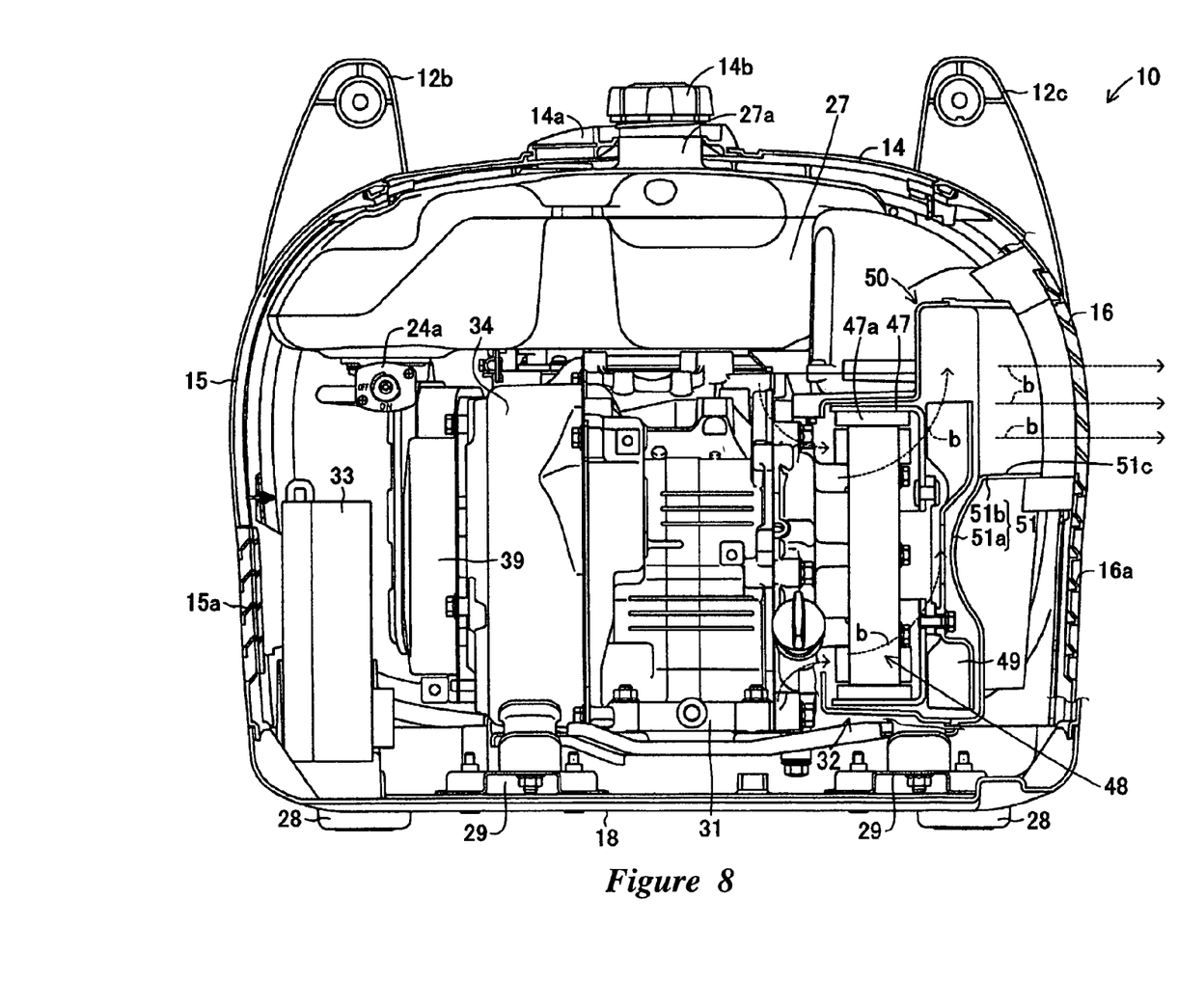
FIG. 8 is a partial cutaway and front elevational view of the engine generator, showing exemplary cooling air paths through a duct inside the engine generator.

Also, while the engine generator 10 is being operated, ambient air can be drawn in the engine generator 10 through the intake holes of the bottom portion and the front portion of the engine generator 10, as shown in FIGS. 7 and 8 by the arrows b (broken lines), as the exhaust fan 49 is driven. The ambient air can be used as cooling air and can flow into the generator duct 51 of the exhaust duct 50. The air cools the generator 32 while flowing through the generator duct 51, and then flows outside from the opening 51c. The cooling air, shown by the arrows b, which flows through a generator cooling air path, cools the generator 32 to maintain its good operating conditions.

In such a manner, the engine duct 52 for guiding to outside the cooling air used for cooling the controller 33, engine 31, and muffler 45, and the generator duct 51 for guiding to the outside the cooling air used for cooling the generator 32 are formed in one monolithic body as the exhaust duct 50. Thus, the generator duct 51 and the engine duct 52 can be accurately positioned as designed. Further, since 52 are formed with a single monolithic member, the number of parts can be reduced, and both ducts can be easily mounted.

Further, in the foregoing engine generator 10, the exhaust duct 50 can be located with the generator duct 51 secured to the crankcase 31a of the engine 31 with the bolts 53. Thus, no member for connecting the muffler 45 and the engine duct 52 is required, so that the number of parts can be further reduced. Further, since there is provided no member for connecting the muffler 45 and the engine duct 52, heat from the muffler 45 can be prevented from being transferred to the engine duct 52 via such member, and also poor ventilation inside the engine duct 52 due to such member can be avoided. Further, since the exhaust duct 50 can be mounted closer to the generator 32 having lower temperatures than the muffler 45, which can be heated to high temperatures, deterioration of the exhaust duct 50 due to heat can be less likely to occur.

Further, in the engine generator 10 in accordance with some embodiments, the generator duct 51 covers the generator 32, and the engine duct 52 covers the muffler 45. Also, the generator duct 51 and the engine duct 52 are located in a manner such that the directions of release of cooling air from the generator duct 51 and the engine duct 52 are parallel to each other. Thus, since there is no need to have cooling air release paths of a meandering shape in the exhaust duct 50, the length thereof in the direction of release of the cooling air can be shortened. Therefore, the shape of the exhaust duct 50 can be simple, and cooling air flows more smoothly, so that cooling efficiency can be improved.

Further, in the engine generator 10, the opening 51c of the generator duct 51 and the opening 52a of the engine duct 52 are aligned on the left and right sides of the exhaust cover 16. Thus, the vertical length of the engine generator 10 can be shortened, so that the size of the engine generator 10 can be reduced and its physical stability can be improved. Further, since the opening 51c of the generator duct 51 can be positioned above the generator 32, the width of the engine generator 10 can be reduced. Also, the space above the generator 32 can be effectively used in such manner.

The engine generator according to the present inventions is not limited to the embodiments described above and can be practiced with appropriate modifications. For example, the positional relation between the generator duct 51 and the engine duct 52, the shape of the exhaust duct 50, the structure of the engine generator 10, and the like can be modified as appropriate within the technical scope of the present inventions.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine generator comprising an engine, a muffler, a generator, an engine cooling air path for allowing passage of cooling air for cooling the engine and the muffler, a generator cooling air path for allowing passage of a cooling air for cooling the generator, an engine duct covering the muffler and shaped for guiding the cooling air from the engine cooling air path to the outside of the engine generator, and a generator duct extending around a periphery of the generator and shaped for guiding the cooling air from the generator cooling air path to the outside of the engine generator separately from the cooling air from the engine cooling path, wherein the engine duct and the generator duct are formed in one monolithic body as a cooling air exhaust duct, the cooling air exhaust duct being directly mounted to the engine as one body.

2. The engine generator according to claim 1, wherein the muffler and the generator are aligned generally in parallel with each other, and wherein the engine duct and the generator duct are located in a manner such that the directions of release of the cooling air from the engine duct and the generator duct are generally parallel to each other.

3. The engine generator according to claim 1, wherein the exhaust duct is disposed with the generator duct secured to a body of the engine.

4. The engine generator according to claim 2, wherein the exhaust duct is disposed with the generator duct secured to a body of the engine.

5. The engine generator according to claim 1, wherein an exhaust-side opening of the engine duct and the generator duct are generally horizontally aligned with each other on a predetermined side face of the engine generator.

6. The engine generator according to claim 2, wherein an exhaust-side opening of the engine duct and the generator duct are generally horizontally aligned with each other on a predetermined side face of the engine generator.

7. The engine generator according to claim 3, wherein an exhaust-side opening of the engine duct and the generator duct are generally horizontally aligned with each other on a predetermined side face of the engine generator.

8. The engine generator according to claim 7, wherein the exhaust-side opening of the generator duct is positioned above the generator.

9. The engine generator according to claim 1, wherein the engine cooling air path and the generator cooling air path are separated from each other to allow passage of the respective cooling air flows.

10. An engine generator comprising an engine, a muffler, a generator, and a single monolithic cooling air guide member mounted directly to the engine and defining an engine and muffler cooling air passage covering the muffler and configured to guide a first ambient air amount into thermal communication with the muffler, and to discharge the first ambient air amount to the outside of the engine generator, the single monolithic cooling air guide member also defining a generator cooling air passage extending around a periphery of the generator and configured to guide a second ambient air amount into thermal communication with the generator, and to discharge the second ambient air amount to the outside of the engine generator separately from the cooing air from the engine and muffler cooling air passage, wherein the single monolithic cooling air guide member is formed in one body.

11. The engine generator according to claim 1, wherein the entire cooling air exhaust duct is supported by an attachment directly mounting the generator duct to a body of the engine.

12. The engine generator according to claim 1, wherein there is no connection between the cooling air exhaust duct and the muffler.

13. The engine generator according to claim 1, wherein the engine duct comprises an engine duct outlet and the generator duct includes a generator duct outlet, the engine duct outlet and the generator duct outlet being spaced from each other.

14. The engine generator according to claim 10, wherein the entire cooling air guide member is supported by an attachment directly mounting the generator duct to a body of the engine.

15. The engine generator according to claim 1, wherein there is no connection between the engine and muffler cooling air passage and the muffler.

16. The engine generator according to claim 1, wherein the engine and muffler cooling air passage comprises an engine passage outlet and the generator cooling air passage includes a generator passage outlet, the engine passage outlet and the generator passage outlet being spaced from each other.

17. The generator according to claim 1, wherein the engine duct surrounds the muffler and the generator duct covers the generator.

18. The generator according to claim 17, wherein the entire cooling air exhaust duct is supported by bolts connecting the generator duct to a crankcase of the engine and without any connectors directly connecting the engine duct to the muffler so as to reduce heat transfer from the muffler to the engine duct.

19. The generator according to claim 1, wherein the engine duct surrounds the muffler and the generator duct covers the generator, and wherein the entire single cooling air guide member is supported by bolts connecting the generator duct to a crankcase of the engine and without any connectors directly connecting the engine duct to the muffler so as to reduce heat transfer from the muffler to the engine duct.

20. The generator according to claim 1, wherein the generator duct is formed with a circular shape corresponding to the shape of the generator and an exhaust fan of the generator and wherein the engine duct is formed with a generally boxed shape configured to accommodate the muffler.

* * * * *

UNITED STATES PATENT AND TRADEMARK OFFICE
CERTIFICATE OF CORRECTION

PATENT NO. : 7,549,403 B2
APPLICATION NO. : 11/326865
DATED : June 23, 2009
INVENTOR(S) : Masanobu Yamamoto et al.

It is certified that error appears in the above-identified patent and that said Letters Patent is hereby corrected as shown below:

In column 7, line 26, after "since" please insert --the generator duct 51 and the engine duct--.

Signed and Sealed this

Fourth Day of May, 2010

David J. Kappos
*Director of the United States Patent and Trademark Office*